United States Patent
Vasseur et al.

(10) Patent No.: US 8,189,482 B2
(45) Date of Patent: May 29, 2012

(54) PROBING-BASED MECHANISM TO REDUCE PREEMPTION PERTURBATION CAUSED BY HIGHER PRIORITY TUNNEL ESTABLISHMENT IN A COMPUTER NETWORK

(75) Inventors: Jean-Philippe Vasseur, Dunstable, MA (US); Stefano Novello, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 850 days.

(21) Appl. No.: 11/676,868

(22) Filed: Feb. 20, 2007

(65) Prior Publication Data

US 2008/0198755 A1 Aug. 21, 2008

(51) Int. Cl.
H04L 12/26 (2006.01)
(52) U.S. Cl. .......................... 370/238; 370/248
(58) Field of Classification Search .................. 370/248, 370/238

See application file for complete search history.

(56) References Cited

U.S. PATENT DOCUMENTS

| | | | |
|---|---|---|---|
| 6,122,272 | A | 9/2000 | Tomaszewski et al. |
| 6,256,309 | B1 | 7/2001 | Daley et al. |
| 6,370,119 | B1 | 4/2002 | Basso et al. |
| 6,493,317 | B1 | 12/2002 | Ma |
| 6,778,492 | B2 | 8/2004 | Charny et al. |
| 6,956,821 | B2 * | 10/2005 | Szviatovszki et al. ........ 370/237 |
| 6,978,394 | B1 | 12/2005 | Charny et al. |
| 7,054,262 | B2 | 5/2006 | Gerstel |
| 2003/0126287 | A1 | 7/2003 | Charny et al. |
| 2005/0088963 | A1* | 4/2005 | Phelps et al. .................. 370/216 |
| 2005/0117512 | A1 | 6/2005 | Vasseur et al. |
| 2005/0188100 | A1* | 8/2005 | Le Roux et al. .............. 709/238 |
| 2005/0281192 | A1 | 12/2005 | Nadeau et al. |
| 2006/0039391 | A1 | 2/2006 | Vasseur et al. |
| 2006/0250961 | A1* | 11/2006 | Vasseur .......................... 370/235 |
| 2006/0250964 | A1 | 11/2006 | Vasseur et al. |
| 2007/0041379 | A1* | 2/2007 | Previdi et al. ................. 370/392 |

OTHER PUBLICATIONS

Awduche, D., Network Working Group Request for Comments 3209, entitled "RSVP-TE: Extensions to RSVP for LSP Tunnels," IETF, Dec. 2001, pp. 1-57.
Smit, H., Network Working Group Request for Comments 3784, entitled "Intermediate-System-to-Intermediate-System (IS-IS) Extensions for Traffic Engineering (TE)," IETF, Jun. 2004, pp. 1-13.
Katz, D. et al, Network Working Group Request for Comments 3630, entitled "Traffic Engineering (TE) Extensions to OSPF Version 2," IETF, Sep. 2003, pp. 1-14.
Braden, R. et al., Network Working Group Request for Comments 2205, entitled "Resource ReSerVation Protocol (RSVP), Version 1 Functional Specification," IETF, Sep. 1997, pp. 1-105.
Berger, L., Network Working Group Request for Comments 3473, entitled "Generalized Multi-Protocol Label Switching (GMPLS) Signaling Resource ReserVation Protocol-Traffic Engineering (RSVP-TE) Extensions," IETF, Jan. 2003, pp. 1-40.

* cited by examiner

*Primary Examiner* — Derrick Ferris
*Assistant Examiner* — Christopher R Crompton
(74) *Attorney, Agent, or Firm* — Cesari and McKenna, LLP

(57) ABSTRACT

In one embodiment, a routing node (e.g., a head-end node) determines a desire to route a selected tunnel (e.g., reroute), and computes a path for the selected tunnel. The routing node probes the path to discover information about tunnels that would be displaced by the selected tunnel if routed over the path (e.g., a number of tunnels), and correspondingly determines whether to establish the selected tunnel based on the information about the tunnels to be displaced. In another embodiment, intermediate nodes along the probed path of the selected tunnel may receive a probe (e.g., signaling message) requesting information about the tunnels that would be displaced by the selected tunnel. In response, each intermediate node inserts the information about the tunnels to be displaced at the intermediate node into the probe, and forwards the probe (e.g., toward the routing node initiating the probe).

26 Claims, 6 Drawing Sheets

//PROBING-BASED MECHANISM TO REDUCE PREEMPTION PERTURBATION CAUSED BY HIGHER PRIORITY TUNNEL ESTABLISHMENT IN A COMPUTER NETWORK

TECHNICAL FIELD

The present disclosure relates generally to computer networks, and, more particularly, to rerouting and preemption of tunnels within computer networks.

BACKGROUND

Multi-Protocol Label Switching (MPLS) Traffic Engineering (TE) supports the ability to configure priorities (e.g., up to eight) for tunnels (e.g., Label Switched Paths, or "TE-LSPs"). Based on priority level, certain tunnels may be preempted by tunnels having a higher priority. That is, priorities may be used to give higher precedence to tunnels carrying higher priority traffic (e.g., sensitive/critical traffic), and lower precedence to tunnels carrying lower priority traffic (e.g., conventional data). (Note that tunnel priority need not be related to traffic priority, as will be understood by those skilled in the art.) Although preemption is a particularly useful mechanism in certain circumstances, it may lead to traffic disruption and network perturbation due to potentially massive rerouting of preempted tunnels (e.g., causing substantial control plane burden, traffic jitter, etc.).

One particularly non-disruptive solution is referred to as "soft preemption", which provides a "make before break" preemption scheme such that preempted tunnels may be reestablished along new routes prior to being preempted from their old routes. As those skilled in the art will understand, while soft preemption is non-disruptive, it potentially causes temporary congestion within the network (e.g., since for a short period of time, two tunnels are in place: the newly admitted high priority tunnel and the preempted tunnel that has not been yet rerouted).

Although soft preemption reduces disruption of traffic (e.g., the forwarding plane), preemption of a large number of tunnels by the establishment of a higher priority tunnel (e.g., due to initial establishment or reoptimization/rerouting) may still cause network perturbations. Particularly, at the control plane burdens and traffic shifts that lead to traffic jitter may be problematic given a large number of displaced tunnels. For example (e.g., in networks where dynamic bandwidth resizing is used), a large high priority tunnel may be reoptimized along a (slightly) more optimal path, resulting in preemption of a very large number of lower priority tunnels.

Current network protocols (e.g., the Interior Gateway Protocol, IGP, with MPLS TE extensions) provide routing nodes (e.g., tunnel head-end nodes) with information relating to available bandwidth per priority level. A path computation algorithm executing on the routing node typically attempts to locate a shortest path for a tunnel having sufficient bandwidth for the priority level of the tunnel (e.g., a shortest constrained path, as in Constrained Shortest Path First, or "CSPF" computation). This computation is performed regardless of the number of tunnels potentially preempted along the newly computed path, particularly because such information is not generally available to the routing node. Thus, the routing node has no way of knowing that establishment of a tunnel along a path, whether for an initial set up of the tunnel or a reoptimization to a (slightly) more optimal path, would result in a large number of tunnels being preempted/displaced.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
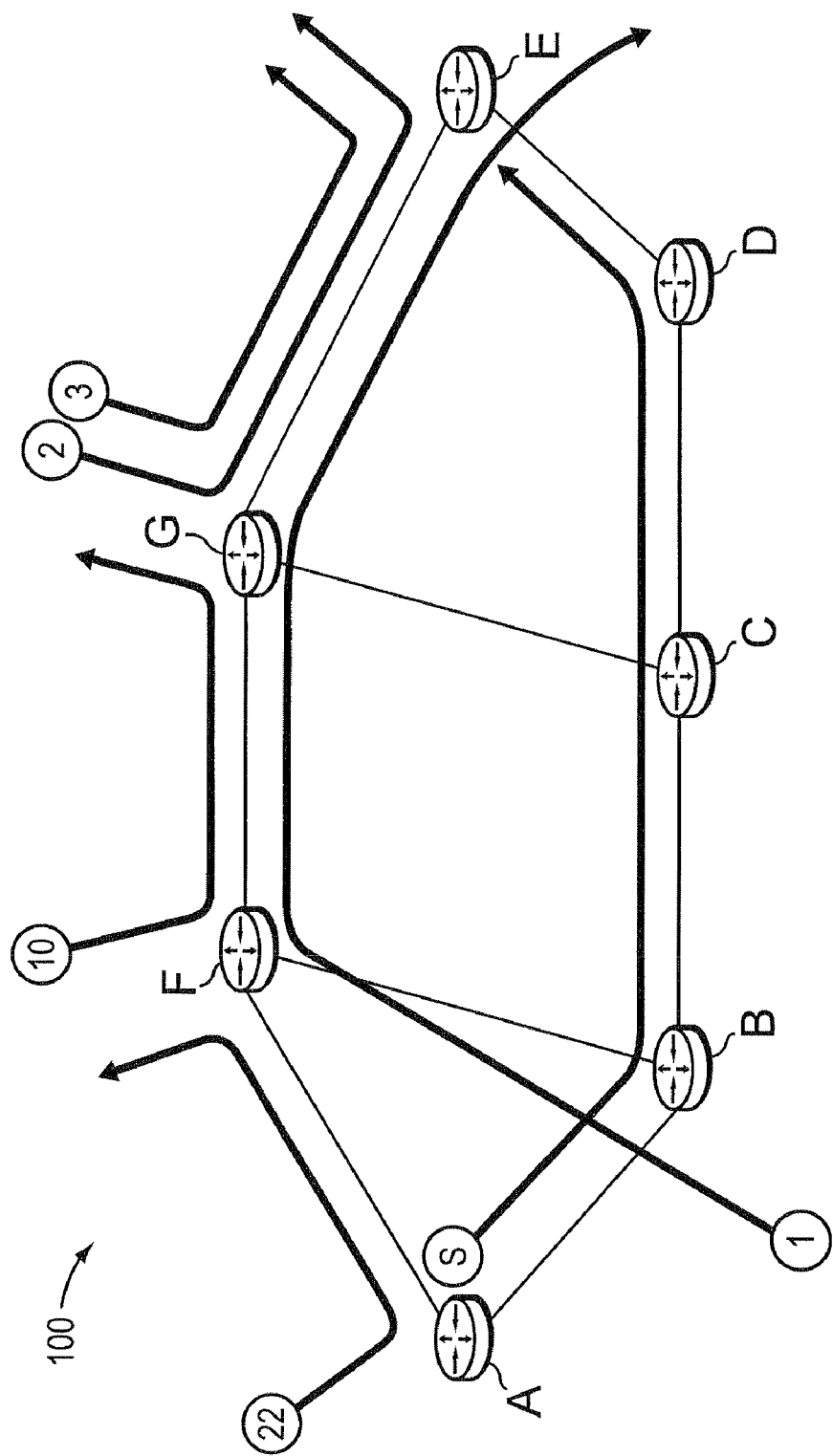
FIG. 1 illustrates an example computer network.

According to embodiments of the disclosure, a routing node (e.g., a head-end node) in response to a desire to route a selected tunnel (e.g., reroute), computes a path for the selected tunnel. The routing node probes the path to discover information about tunnels that would be displaced by the selected tunnel if routed over the path (e.g., a number of tunnels), and correspondingly determines whether to establish the selected tunnel based on the information of the tunnels to be displaced.

Also, according to embodiments of the disclosure, intermediate nodes along the probed path of the selected tunnel may receive a probe (e.g., signaling message) requesting information about the tunnels that would be displaced by the selected tunnel (e.g., a number of tunnels. In response, each intermediate node inserts information about the tunnels to be displaced at the intermediate node into the probe, and forwards the probe (e.g., toward the routing node initiating the probe).

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

FIG. 1 is a schematic block diagram of an example computer network 100 illustratively comprising nodes (e.g., routers) A-G interconnected by links as shown. Illustratively, various tunnels (shown as thick arrows) may traverse the links between head-end nodes and tail-end nodes (not necessarily shown) through one or more intermediate nodes, as described herein and as will be understood by those skilled in the art. Those skilled in the art will also understand that any number of nodes, routers, links (e.g., with any bandwidth values and/or costs), etc. may be used in the computer network, and that the view shown herein is for simplicity. Further, those skilled in the art will also understand that while the present invention is described generally, it may apply to any network configuration within an AS or area/level, or throughout multiple ASes or areas/levels ("inter-domain"), etc.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
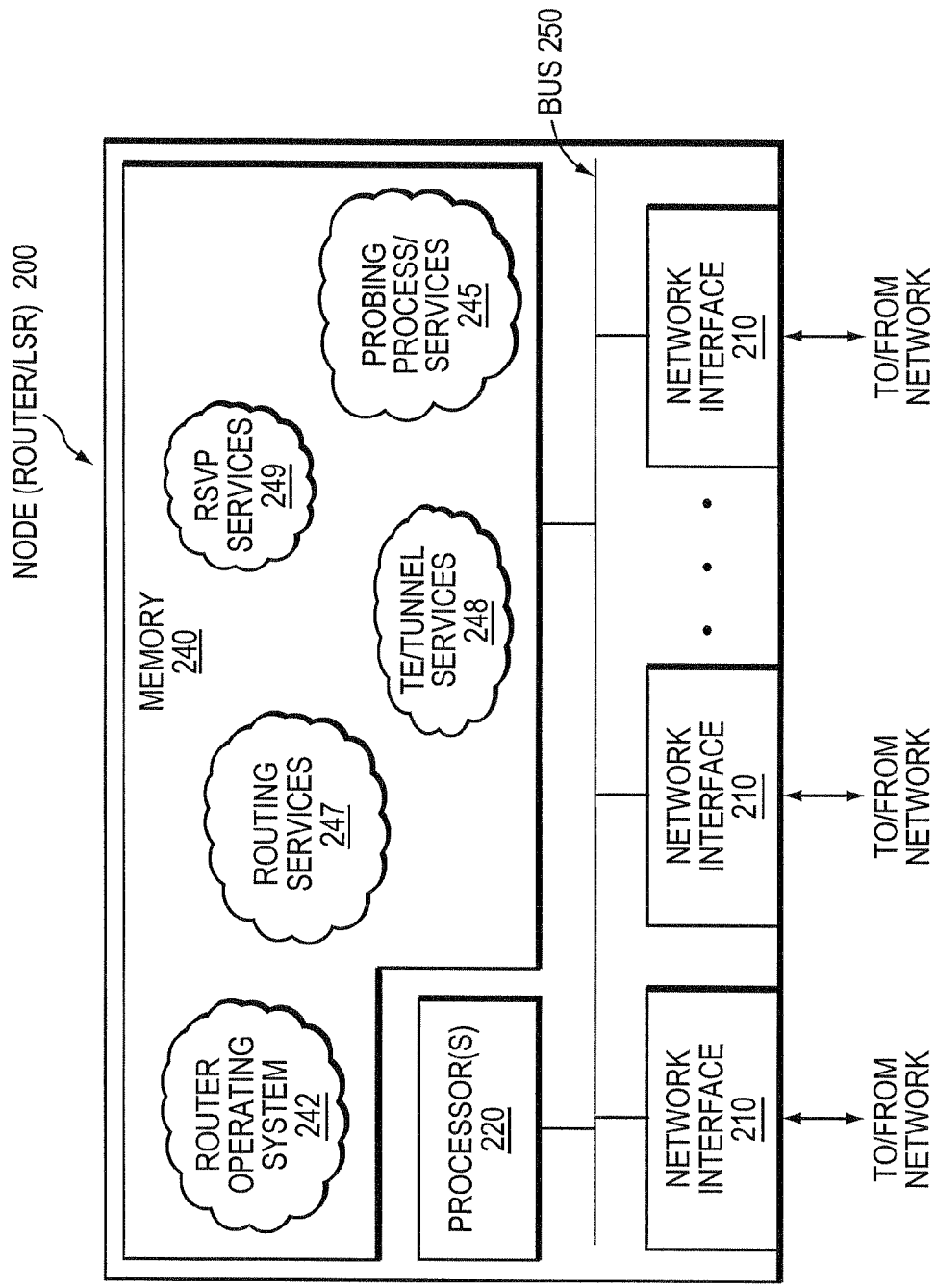
FIG. 2 illustrates an example network device/node.

FIG. 2 is a schematic block diagram of an example node/router 200 that may be advantageously used with one or more embodiments described herein, e.g., as a head-end node or intermediate node (e.g., label switched routers, "LSRs"). The node comprises a plurality of network interfaces 210, one or more processors 220, and a memory 240 inter-connected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the router. These software processes and/or services may comprise routing services 247, Resource ReSerVation Protocol (RSVP) services 249, Traffic Engineering (TE)/Tunnel services 248, and as described herein, an example probing process/service 245 (e.g., particular to a routing/head-end node or intermediate node). It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 249 contain computer executable instructions for implementing RSVP and processing RSVP messages in accordance with the embodiments described herein. Further, TE services 248 contain computer executable instructions for implementing TE functions in accordance with the embodiments described herein. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE Database (TED, not shown) may be illustratively resident in memory 240 and used to store TE information provided by the routing protocols, such as IGP, BGP, and/or RSVP (e.g., with extensions). The TED may be illustratively maintained and managed by TE services 248.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

In particular, in accordance with RSVP, to request a data flow (tunnel) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the tunnel. The Path message may contain various information about the data flow including, e.g., traffic characteristics of the data flow. Also in accordance with the RSVP, a receiver establishes the tunnel between the sender and receiver by responding to the sender's Path message with a reservation request (Resv) message. The reservation request message travels upstream hop-by-hop along the flow from the receiver to the sender (i.e., along intermediate nodes). The reservation request message contains information that is used by intermediate nodes along the flow to reserve resources for the data flow between the sender and the receiver, to confirm the attributes of the tunnel, and provide a tunnel label. If an intermediate node in the path between the sender and receiver acquires a Path message or Resv message for a new or established reservation (tunnel) and encounters an error (e.g., insufficient resources, failed network element, etc.), the intermediate node generates and forwards a path or reservation error (PathErr or ResvErr, hereinafter Error) message to the sender or receiver, respectively.

Figure 3:
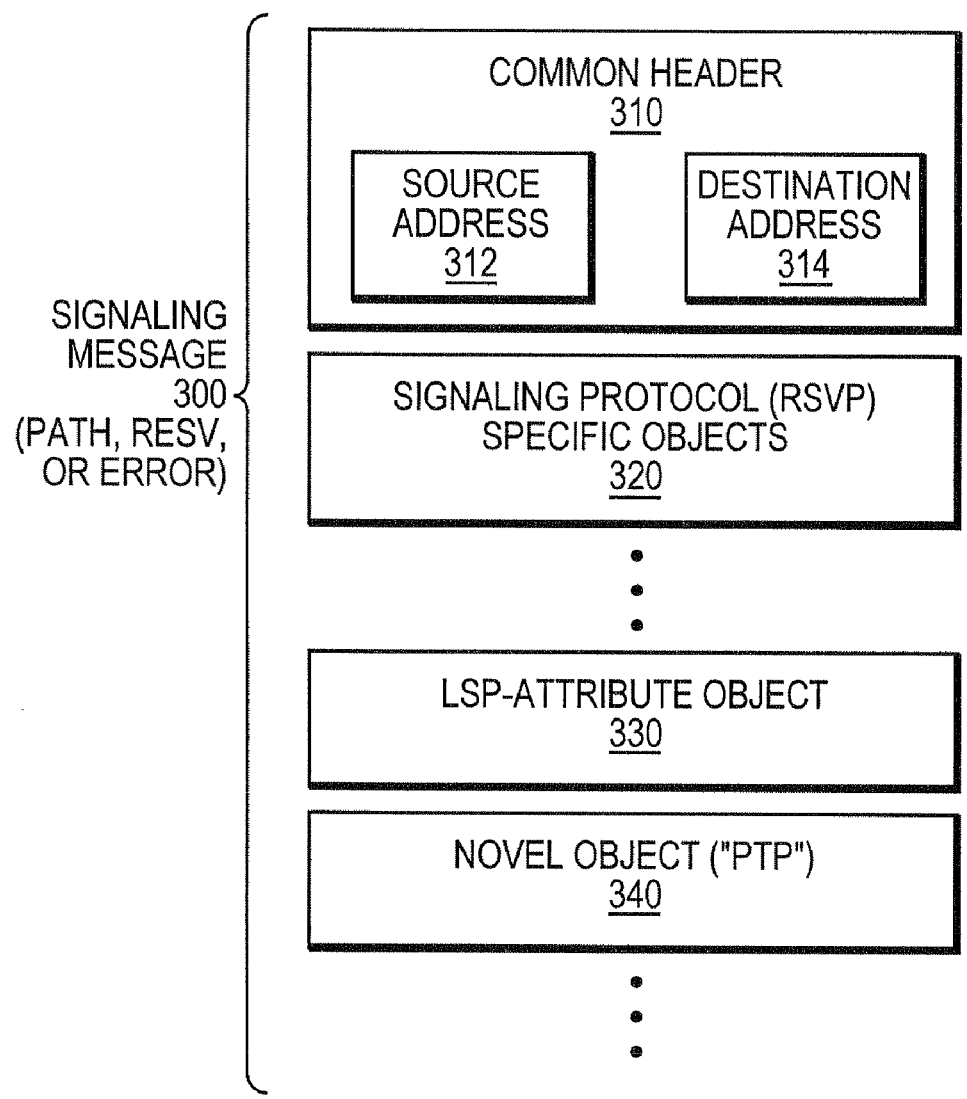
FIG. 3 illustrates an example RSVP message.

FIG. 3 is a schematic block diagram of portions of a signaling message 300 (e.g., an RSVP message, such as Path, Resv or Error) that may be advantageously used with the present invention. Message 300 contains, inter alia, a common header 310, one or more signaling protocol specific objects 320, such as an LSP-Attribute object 330, as well as one or more other (e.g., novel) objects 340, such as a "Possible Tunnel Preemptions" (PTP) object described below. The common header 310 may comprise a source address 312 and destination address 314, denoting the origination and requested termination of the message 300. Protocol specific objects 320 contain objects necessary for each type of message 300 (e.g., Path, Resv, Error, etc.). For instance, a Path message may have a sender template object, Tspec object, Previous-hop object, etc. A Resv message, on the other hand, may have specific objects 320 for a label object, session object, filter spec object, etc. Also, Error messages 300 (e.g., PathErr or ResvErr) may have specific objects 320, such as for defining the type of error, etc. Various flags and/or objects ("TLVs") may also be contained within the objects 320-340, as will be understood by those skilled in the art.

In particular, the TLV encoded format is used to identify a type (T) of information is being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
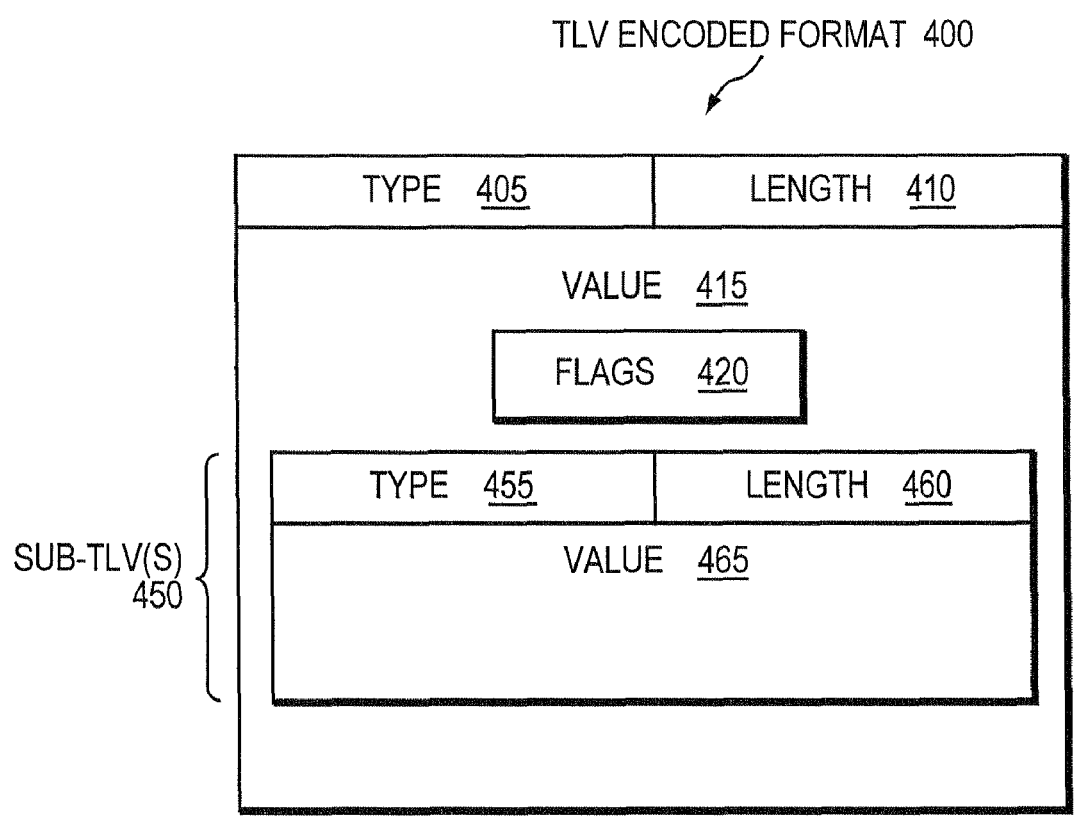
FIG. 4 illustrates an example TLV format.

FIG. 4 is a schematic block diagram illustrating the TLV encoded format 400 that may be advantageously used with the one or more embodiments described herein. The TLV 400 may be used for any variable length field contained in an RSVP message 300 or other protocol messages in accordance with the embodiments described herein (e.g., as the novel PTP object 340 and/or as novel sub-objects to conventional objects such as the LSP-Attribute object 330). The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "pay-load" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein.

It should also be noted that in accordance with RSVP signaling, the state of the RSVP is refreshed on a timed interval, e.g., every thirty seconds, in which RSVP Path and Resv messages are exchanged. This timed interval is configurable by a system administrator. Moreover, various methods understood by those skilled in the art may be utilized to produce route record objects (RROs) contained in signaling messages for a tunnel.

Establishment of a tunnel (e.g., TE-LSP) requires computation of a path between a head-end node (LSR) to a tail-end node, signaling along the path (e.g., through RSVP-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node or by some other entity operating as a path computation element (PCE) not co-located on the head-end node. Various path computation methodologies are available including CSPF (constrained shortest path first).

As noted, path computation algorithms typically attempt to locate a path for a tunnel having sufficient bandwidth for the priority level of the tunnel regardless of the number of tunnels potentially preempted along the newly computed path. In particular, the routing node (the node computing the path) has no way of knowing that establishment of a tunnel along a path, whether for an initial set up of the tunnel or a reoptimization to a (slightly) more optimal path, would result in a large number of tunnels being preempted/displaced.

Reducing Preemption Perturbation

According to embodiments of the disclosure, a routing node (e.g., a head-end node) in response to a desire to route a selected tunnel (e.g., reroute), computes a path for the selected tunnel. The routing node probes the path to discover information about tunnels that would be displaced by the selected tunnel if routed over the path (e.g., a number of tunnels), and correspondingly determines whether to establish the selected tunnel based on the information about the tunnels to be displaced.

In an illustrative embodiment, probing process/services 245 contain computer executable instructions executed by each processor 220 (e.g., of a routing node and/or intermediate node) to perform functions relating to the novel techniques described herein to provide for a probe-based mechanism to reduce preemption perturbation caused by higher priority tunnel establishment in a computer network.

Operationally, a routing node (e.g., node A), such as a head-end node of a tunnel (or other node computing the path of a tunnel), may desire to route a selected tunnel in order to set up a new tunnel, reroute an existing tunnel (e.g., for reoptimization or other purpose), etc. For example, node A may already have an established tunnel (selected tunnel S in FIG. 1) along a particular path through the network to a tail-end node (e.g., node E), such as through intermediate nodes B-D as shown. Under certain situations (as will be understood by those skilled in the art), it may be beneficial to reroute an established tunnel from its previous path to a more optimal path, e.g., where resources that previously were unavailable have since become available (e.g., added links, bandwidth reservations released, etc.). A "more optimal" path, for instance, may generally refer to a path having a lower (decreased) cost than the previous path, or other improved metric as desired by configuration, such as hop-count, delay, jitter, etc.

In response to a desire to route a selected tunnel, the routing node (node A) may compute a path for the selected tunnel. For example, node A may compute a new path for tunnel S that traverses intermediate nodes F and G (path A-F-G-E) that is more optimal (e.g., lower cost) than the previous path for tunnel S. According to one or more embodiments described herein, prior to simply establishing (or reestablishing) the selected tunnel over the computed path regardless of the number of tunnels that may be preempted, the routing node may be configured to send a probe along the path to discover information about tunnels that may be preempted should the selected tunnel be established, e.g., how many tunnels.

While the probe may be configured to operate in accordance with a specific probing protocol (with probe messages, etc.), one or more embodiments described herein illustratively make use of extensions to signaling messages already used by tunneling protocols, such as RSVP signaling messages 300. In particular, to send a probe along the computed path (or, to "probe the path"), the routing node may establish a "fake" tunnel along the path. A fake tunnel, generally, is a tunnel that may include all information/attributes ("characteristics") of a real tunnel (e.g., in this instance, of the selected tunnel), for which intermediate nodes along the tunnel are configured not to reserve resources and may also be configured not to generate/exchange labels. For example, a new object (e.g., a TLV 400) within the LSP-Attribute object 330 of an RSVP Path message 300 may be used to indicate that the selected tunnel is a fake tunnel (i.e., as used herein, is a probe).

Figure 5:
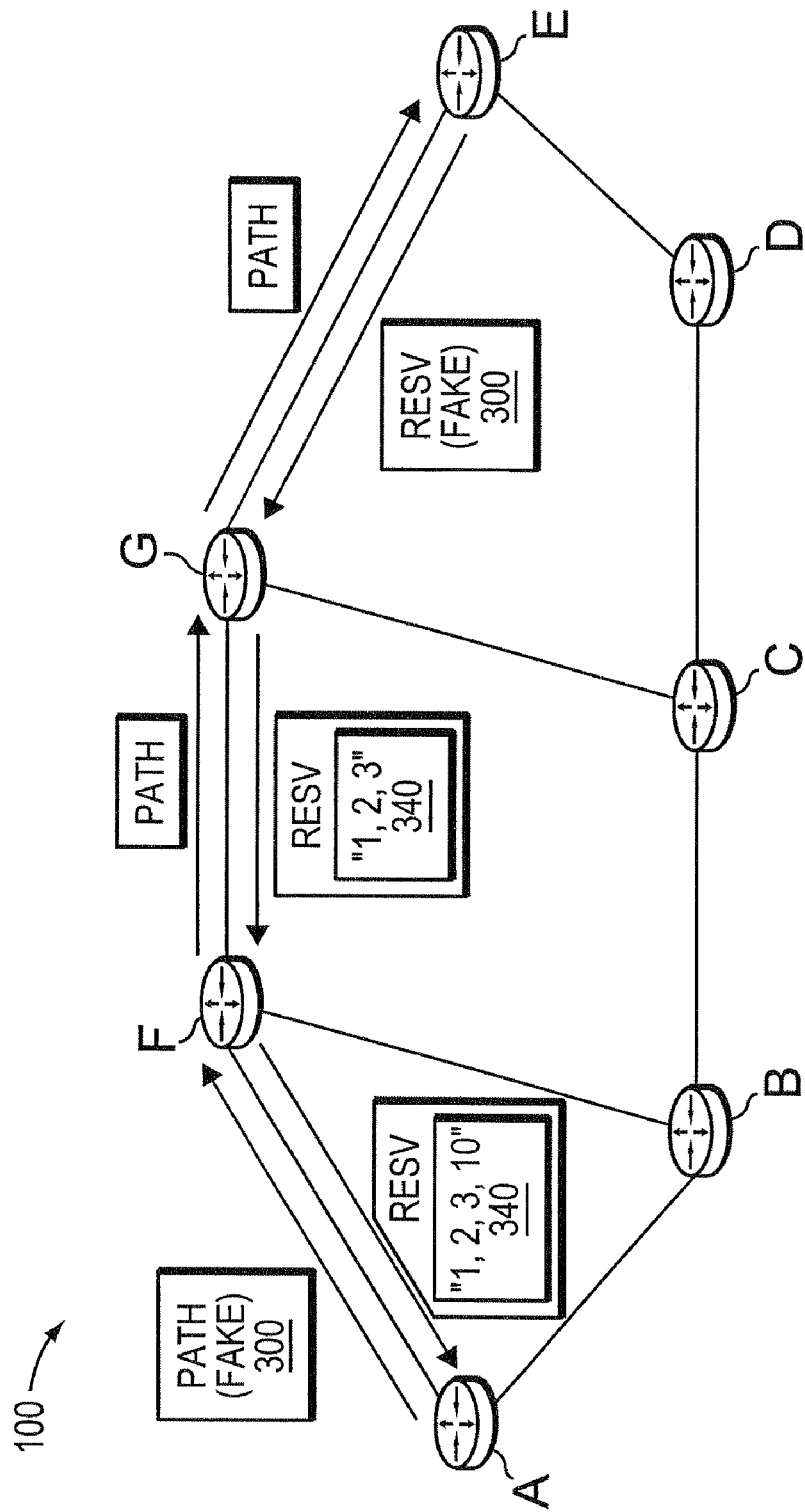
FIG. 5 illustrates the computer network as in FIG. 1 with example probing exchanges in accordance with one or more embodiments described herein.

Upon receiving a probe embodied as a Path message 300 that is, in turn, configured to signal the fake tunnel, an intermediate node simply forwards the Path message to a computed (or specified) downstream neighbor. For example, FIG. 5 illustrates the computer network 100 as in FIG. 1 with example probing exchanges in accordance with one or more embodiments described herein (with tunnel representations removed for clarity). The routing node (head-end node A) sends a Path message 300 to the first downstream neighbor along the computed path, e.g., intermediate node F. Node F, then, forwards the Path message to its downstream neighbor along the path, intermediate node G, which forwards the Path message to its downstream neighbor, e.g., the tail-end node E. (Note that in addition to not reserving any resources and possibly not exchanging labels, the nodes along the path need not perform Call Admission Control (CAC) functions for the fake tunnel, either.) Upon receiving the Path message (the probe), the tail-end node may generate and return an RSVP Resv message 300 toward the head-end node A, illustratively containing the PTP object 340, e.g., in response to the Path message signaling a fake tunnel. (In other words, the tail-end node may return the probe with the PTP object 340 to be populated as described below.)

According to embodiments of the disclosure, intermediate nodes along the probed path of the selected tunnel (e.g., nodes F and G) may receive a probe (e.g., RSVP Resv message 300) requesting information about the tunnels that would be displaced by the selected tunnel. For instance, the selected tunnel information (e.g., within the fake tunnel signaling or otherwise within the probe message) may contain an associated priority level, bandwidth, source/destination, etc., of the selected tunnel. Tunnels to be displaced by the selected tunnel, therefore, comprise any tunnel that the intermediate node would preempt (if any are necessary) in order to place the selected tunnel if so established, as will be understood by those skilled in the art.

In response to receiving the probe's request, each intermediate node inserts (records) information about the tunnels to be displaced at the node into the probe (e.g., into PTP object 340), and forwards the probe (e.g., toward the routing node initiating the probe, such as along the path of the RSVP Resv message 300). The information in its simplest form indicates a number of tunnels to be displaced, but illustratively may include one or more characteristics of the tunnels to be displaced. For instance, example characteristics that may be beneficially included within the PTP object 340 may comprise a tunnel identification (ID), a source (head-end node), a destination (tail-end node), an extended tunnel ID, a tunnel sender, a label switched path ID, a bandwidth of the tunnel, an availability of fast reroute (FRR) (failure protection) for the tunnel, a priority of the tunnel, or any other information that may be necessary, such as information generally found within RROs, as will be understood by those skilled in the art.

Based on the additional information, an intermediate node may determine whether any tunnels that would be displaced at that intermediate node have already been recorded by the other intermediate nodes. For example, referring to FIG. 5 (and FIG. 1), the Resv message (probe) 300 is returned from the tail-end node E to a first intermediate node G. Assuming that node G determines that it would displace, e.g., preempt, tunnels 1, 2, and 3 (FIG. 1), node G may insert information about tunnels 1, 2, and 3 into the PTP object 340, and may forward the probe upstream to a second intermediate node F. Because node F shares tunnel 1 with node G, node F may determine that tunnel 1 has already been accounted for (i.e., would already be displaced by another intermediate node), and thus need not reinsert tunnel 1 in the PTP object 340. Note further that because tunnel 1 has already been accounted for, node F may further be configured to include that tunnel in its preemption algorithm to determine which tunnels to displace. For instance, if node F originally would have selected tunnels 10 and another tunnel X (not shown), by knowing that another intermediate node is displacing tunnel 1, node F may determine that tunnel X need not be displaced if tunnel 1 is displaced along with tunnel 10 instead. Accordingly, intermediate node F records the additional tunnel 10 into the PTP object 340 of the RSVP Resv message (probe) 300, and forwards the message 300 to the head-end node (the routing node) A. (In other words, information inserted in the PTP object 340 by an intermediate node regarding the number of tunnels to be displaced at that node does not include any tunnels that would be displaced at the node if those tunnels have already been indicated by other intermediate nodes.)

In addition, in accordance with embodiments of the disclosure, the PTP object may be bounded in size, such that the associated probe (signaling message 300) size also remains bounded. For instance, if variable length objects become too large due to substantial (large) amounts of information, the probe may exceed communication protocol size limitations, thus becoming fragmented or causing errors (or, simply, becoming large enough to be computationally burdensome). Should an intermediate node determine that the information about the number of tunnels to be displaced (i.e., the information in the PTP object 340) is larger than a configurable threshold, the intermediate node may compress the information into a representation. In other words, when the number of displaced (preempted) tunnels is small, the PTP object 340 may contain a list of all the tunnels and their associated characteristics; however, when the number of displaced tunnels is large, a compressed representation may be used. For example, the compression may remove the information about the tunnels other than the tunnel ID, or may go so far as to only provide the number of displaced tunnels (where each intermediate node may only increment the number without knowing if its tunnel has already been accounted for). Those skilled in the art may appreciate that too great a compression may result in "false positives", collisions, or otherwise inaccurate information. As such, the compression utilized by the intermediate nodes should attempt to reduce such inaccuracies to an acceptable level. (An example compression algorithm that may be used is a conventional "bloom filter", as will be understood by those skilled in the art.)

Upon receiving the returned probe (e.g., the Resv message 300), the routing node (e.g., head-end node A) processes the PTP object 340 to extract the information contained therein. Depending upon the procession of the PTP object, the information may be a list of tunnels, a number of tunnels, or other representation of the impact of establishing the selected tunnel over the computed path. From the extracted information (and local information, e.g., tunnel 22), the routing node may then decide/determine whether to establish the selected tunnel along the path (reroute the tunnel or initially set it up). Illustratively, one or more rules may be defined upon which the determination may be made. For instance, rules may be defined governing the decision based on number of potentially displaced tunnels, the potential improvement (e.g., cost, delay, jitter), etc. In a simplest form, a rule may be defined where the selected tunnel is only to be established if the number of tunnels to be displaced is less than a certain amount, regardless of metric improvement (e.g., where the selected tunnel is being set up initially, not reoptimized).

Notably, by computing a cost decrease (improvement) of the new path versus the previous path, various rules may be defined relating the cost to the number of preempted tunnels. For example, rules may be defined such as: i) if the path cost decrease is less than a certain amount, and the number of displaced tunnels is greater than a certain amount, do not establish the tunnel; or ii) if the path cost decrease is between a first and second amount, and the number of displaced tunnels is greater than a certain amount, do not establish the tunnel; or iii) if the path cost decrease is less than a certain amount, but the number of displaced tunnels is less than a certain amount, establish the tunnel; or iv) if the path cost decrease is greater than a certain amount, establish the tunnel regardless of the number of tunnels that will be displaced. The actual rules defined are substantially limitless, and those mentioned herein are merely to be taken as representative examples. Factors other than cost and number of displaced (preempted) tunnels may be included within the rules, such as other metric improvements (or, notably, changes for the worse), failure protection for the displaced tunnels, etc. Also, rules may be defined according to selected tunnel classification, such as one set of rules for tunnels over a certain bandwidth size, another set of rules for tunnels with priorities higher than a certain priority level, etc.

In accordance with one or more embodiments described herein, the routing node may be configured to compute multiple paths for the selected tunnel, and determine which of those paths has a more favorable outcome. For instance, based on configurable weighting, the routing node may determine that a path with a cost of "10" that would displace fifty tunnels might not be as acceptable as a path with a cost of "11" that would displace only ten tunnels. Note also that the routing node may determine that the metric (e.g., cost) improvement gained for a reoptimization is not sufficient to merit even initiating the probe, and may thus determine not to establish the selected tunnel accordingly.

Depending upon the configuration of the rules and upon the information obtained from the path computation and probe, the routing node may determine whether to establish the selected tunnel over the computed path. In response to deeming establishment of the selected tunnel acceptable, the routing node may so establish the selected tunnel, i.e., as a real tunnel with resource reservation and exchanged labels, etc. (Under certain network configurations, the "establishment" may require new signaling of a new tunnel according to the selected tunnel along the computed path, or adjusting the current signaling of the fake tunnel to indicate that the fake tunnel should now be treated as a real tunnel.) In the event, however, that the number of tunnels to be displaced (e.g., preempted) by the selected tunnel is unacceptable (e.g., on its own, or in conjunction with one or more metric changes), the routing node may not establish the selected tunnel over the computer path (but may recompute a different path, if so desired).

Notably, the probing mechanism as described herein makes no assumption as to the preemption algorithms utilized by the intermediate nodes. In particular, only the result of the preemption algorithm, e.g., the preempted tunnels, the number of preempted tunnels, or other corresponding representation, need be discovered. Accordingly, the manner in which each intermediate node determines which or how many tunnels to preempt is not important, so long as the intermediate node uses the same algorithm if actually preempting the tunnels. For example, for inter-domain tunnel paths, different domains may use different preemption algorithms and priority levels (e.g., different priority applied to voice tunnels, etc.). Again, because only the output of the algorithm need be discovered, this inter-domain difference is inconsequential.

Moreover, the desire to reroute a tunnel need not be applied to all tunnels with possibly improved metrics. That is, the routing node may be configured to perform the techniques described herein for only certain tunnels. For example, the techniques described herein may be reserved for use with tunnels having certain priorities and/or sizes, manually selected tunnels, etc. (e.g., to reduce probing in the network).

Figure 6:
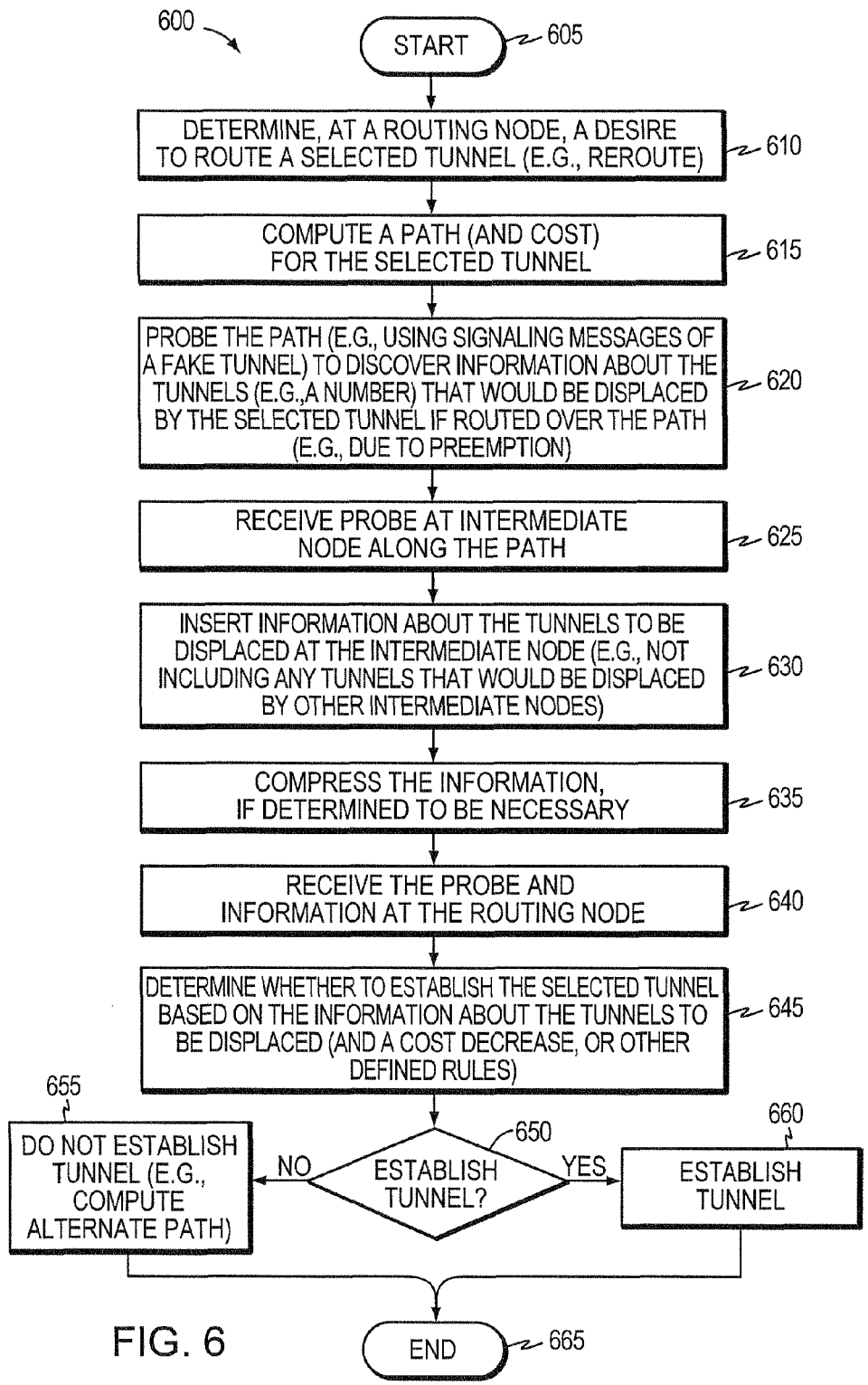
FIG. 6 illustrates an example procedure for a probing-based mechanism to reduce preemption perturbation caused by higher priority tunnel establishment in accordance with one or more embodiments described herein.

FIG. 6 illustrates an example procedure for a probing-based mechanism to reduce preemption perturbation caused by higher priority tunnel establishment in accordance with one or more embodiments described herein. The procedure 600 starts at step 605, and continues to step 610, where a routing node, e.g., head-end node A, determines a desire to route a selected tunnel (e.g., tunnel S). For example, as mentioned above, the determination may be manual or dynamic, and may be to set up a new tunnel, reroute an existing tunnel, etc. Accordingly, in step 615, the routing node computes a path (and cost) for the selected tunnel, e.g., to tail-end node E. As described in further detail above, the routing node probes the computed path for the selected tunnel in step 620 to discover information about tunnels that would be displaced by the selected tunnel if routed over the path (e.g., due to preemption), such as a number of tunnels that would be displaced. For instance, the routing node A may initiate signaling messages (e.g., RSVP Path messages 300), each embodied as a probe, for a fake tunnel that includes information about the selected tunnel S, such as bandwidth, priority, etc.

At step 625, an intermediate node along the path receives the probe (that is, each intermediate node, in turn, receives the probe, e.g., nodes G and F). Notably, as described above, the probe may illustratively be embodied as an RSVP Resv message 300 (with PTP object 340) that is returned by the tail-end node (E) of the fake tunnel in response to receiving an RSVP Path message 300. As such, each intermediate node along the path may have first received the Path message prior to receiving the Resv message (the probe). Each intermediate node, then, inserts information about the tunnels to be displaced by that particular intermediate node into the probe (e.g., PTP object 340) in step 630 (e.g., the number of tunnels to be displaced). According to one or more embodiments as described herein, the information need not include any tunnels that would be displaced by other intermediate nodes. Further, in step 635, an intermediate node may compress the information, if determined to be necessary, as mentioned above.

In step 640, the routing node receives the returned probe and information (e.g., Resv message 300 with illustrative PTP object 340), and determines in step 645 whether to establish the selected tunnel based on the information about the tunnels to be displaced as indicated by the probe (e.g., the number of tunnels). For instance, the determination may be based on one or more defined rules (discussed above), such as upper and lower thresholds/boundaries on the number of displaced tunnels, cost decreases, etc. In response to determining that the selected tunnel is not to be established in step 650, the routing node does not establish the tunnel (step 655), and the process may either end in step 665, or the routing node may compute and probe an alternate path. Conversely, upon determining that the selected tunnel may be established in step 650, the routing node may establish the tunnel in step 660 along the computed path, presumably with an acceptable amount of preempted tunnels (based on the defined rules), and the procedure 600 ends in step 665.

Advantageously, the novel techniques described herein reduce preemption perturbation caused by higher priority tunnel establishment in a computer network. In particular, by implementing a probing mechanism as described, the novel techniques may be used to evaluate the preemption impact of a potentially established (e.g., rerouted) tunnel, and to determine whether to establish the higher priority tunnel along its presently computed path. Further, the dynamic aspects of one or more embodiments described herein alleviate the need for cumbersome and inefficient manual configuration and determinations.

While there have been shown and described illustrative embodiments that reduce preemption perturbation caused by higher priority tunnel establishment in a computer network, it is to be understood that various other adaptations and modifications may be made within the spirit and scope of the present invention. For example, the embodiments have been shown and described herein relating to various protocol messages and fields, e.g., RSVP and related fields, etc. However, the embodiments of the invention in their broader sense are not so limited, and may, in fact, be used with other messaging/notification protocols or other fields, such as proprietary or application specific protocols, or other fields (e.g., TLVs) within the messages described herein, as will be understood by those skilled in the art. In addition, while the above description illustratively populates the PTP object 340 in the returned probe (the upstream RSVP Resv message 300), other embodiments may populate the object 340 along the downstream transmission (e.g., the RSVP Path message), and simply maintain it for the upstream return.

Moreover, while the above description is directed to determining whether to establish a selected tunnel (e.g., dynamically determining), other suitable applications may beneficially make use of the inventive techniques described herein. For instance, the probing mechanism may also be used for management purposes, e.g., to determine the number of tunnels along a path at each priority level without considering a particular selected tunnel. Also, some networks may utilize explicit paths for tunnels with a manual switchover (as will be understood by those skilled in the art), such that prior to manually switching the tunnel paths, the probing mechanism may be manually initiated by an administrator to determine whether the switch would be acceptable.

Furthermore, the probing technique is not limited to discovering information about the tunnels that would be preempted. In particular, any information that the underlying signaling method can discover may be used to determine whether to reroute the selected tunnel. For example, when using RSVP with loose hops, certain elements along the path (e.g., border routers, path computation elements, etc.) may compute portions of the path, as will be understood by those skilled in the art. Those computed portions of the path and other properties (such as an availability of failure protection, e.g., FRR) may thus be signaled back to the head-end node with the probe (e.g., the fake tunnel signaling). Otherwise, current techniques to learn the computed portions and other information of the selected tunnel (that is, the preempting tunnel) generally require "real" signaling, thus reserving resources and potentially preempting tunnels. In the event this information results in non-establishment, the reservations and preemptions may have been unnecessary.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
    determining a desire to route a selected tunnel;
    computing a path for the selected tunnel;
    probing, by a routing node, one or more intermediate nodes located downstream along the path to discover information about tunnels to be displaced at the intermediate nodes by the selected tunnel if routed over the path;
    receiving, at the routing node, a response from the one or more intermediate nodes located downstream along the path, the response including information that indicates a number of tunnels to be displaced at intermediate nodes by the selected tunnel if routed over the path; and
    determining, by the routing node, whether to establish the selected tunnel based on the information that indicates the number of tunnels to be displaced.

2. The method as in claim 1, wherein the desire to route the selected tunnel comprises rerouting an existing tunnel to the path from a previous path.

3. The method as in claim 2, wherein the previous path has a previous cost, the method further comprising:
    computing a cost for the path for the selected tunnel;
    computing a cost decrease of the cost for the path from the previous cost; and
    determining whether to establish the selected tunnel based on the information that indicates the number of tunnels to be displaced and the cost decrease.

4. The method as in claim 1, further comprising:
    establishing a fake tunnel along the path, the fake tunnel indicating one or more characteristics of the selected tunnel; and
    utilizing signaling messages of the fake tunnel to probe the one or more intermediate nodes located along the path.

5. The method as in claim 4, wherein the signaling messages are Resource reSerVation Protocol (RSVP) signaling messages.

6. The method as in claim 4, further comprising:
    receiving the signaling messages at one or more intermediate nodes located downstream along the path; and
    inserting information that indicates a number of tunnels to be displaced at each intermediate node into the signaling messages as each intermediate node receives the signaling messages, and returning the signaling messages to the routing node as the response.

7. The method as in claim 6, further comprising:
    including one or more characteristics of the tunnels to be displaced within the information that indicates the number of tunnels to be displaced.

8. The method as in claim 7, wherein the one or more characteristics are selected from the group consisting of: a tunnel identification (ID); a source; a destination; an extended tunnel ID; a tunnel sender; a label switched path ID; a bandwidth of the tunnel; availability of fast reroute (FRR) for the tunnel; and a priority of the tunnel.

9. The method as in claim 6, further comprising:
    determining, at an intermediate node, that the information that indicates the number of tunnels to be displaced is larger than a configurable threshold; and
    compressing the information that indicates the number of tunnels to be displaced into a representation.

10. The method as in claim 1, wherein the selected tunnel has a priority level, and the tunnels to be displaced are tunnels that would be preempted by establishment of the selected tunnel along the path.

11. The method as in claim 1, further comprising:
    defining rules upon which to base the determination of whether to establish the selected tunnel based on the information that indicates the number of tunnels to be displaced.

12. The method as in claim 1, further comprising:
    probing the path to discover information about the selected tunnel; and
    determining whether to establish the selected tunnel based on the information about the selected tunnel as discovered by the probe.

13. The method as in claim 1 wherein the routing node is a head-end node of the selected tunnel.

14. A method, comprising:
    receiving a signaling message from a routing node at an intermediate node located downstream along a path of a selected tunnel, the signaling message requesting information about tunnels to be displaced by the selected tunnel if routed over the path;
    inserting information that indicates a number of tunnels to be displaced at the intermediate node into the signaling message; and
    forwarding the signaling message, that includes the information that indicates the number of tunnels to be displaced, to the routing node.

15. The method as in claim 14, wherein the signaling message signals a fake tunnel along the path of the selected tunnel, the fake tunnel indicating one or more characteristics of the selected tunnel.

16. The method as in claim 14, further comprising:
    including one or more characteristics of the tunnels to be displaced within the information that indicates the number of tunnels to be displaced.

17. The method as in claim 14, further comprising:
    determining that the information that indicates the number of tunnels to be displaced is larger than a configurable threshold; and
    compressing the information that indicates the number of tunnels to be displaced into a representation.

18. The method as in claim 14, further comprising:
    receiving, within the signaling message, an indication of tunnels to be displaced by other intermediate nodes located downstream along the path of the selected tunnel;
    determining, at the receiving intermediate node, whether any tunnels to be displaced at the receiving intermediate node have already been indicated by the other intermediate nodes; and
    inserting information that indicates a number of tunnels to be displaced at the receiving intermediate node that does not include any tunnels to be displaced at the receiving intermediate node that have already been indicated by the other intermediate nodes.

19. The method as in claim 14, wherein the selected tunnel has a priority level, and the tunnels to be displaced are tunnels that would be preempted by establishment of the selected tunnel along the path.

20. The method as in claim 14 wherein the routing node is a head-end node of the selected tunnel.

21. A system, comprising:
a routing node configured to i) determine a desire to route a selected tunnel, ii) compute a path for the selected tunnel, iii) probe the path to discover information that indicates a number of tunnels to be displaced by the selected tunnel if routed over the path, and iv) determine whether to establish the selected tunnel based on the information that indicates the number of tunnels to be displaced; and
one or more intermediate nodes located downstream along the path of the selected tunnel, each intermediate node configured to i) receive the probe that originated from the routing node, the probe requesting information that indicates the number of tunnels to be displaced by the selected tunnel, ii) insert information that indicates the number of tunnels to be displaced at the intermediate node into the probe, and iii) forward the probe.

22. A routing node comprising:
one or more network interfaces configured to communicate with one or more intermediate nodes;
one or more processors coupled to the network interfaces and configured to execute software services; and
a memory configured to store software services executable by the one or more processors, the software services configured to, when executed,
compute a path for the selected tunnel,
probe one or more intermediate nodes located downstream along the computed path over at least one of the one or more network interfaces, to discover information that indicates a number of other tunnels to be displaced by the selected tunnel, if the selected tunnel were routed over the computed path,
process a response received on at least one of the one or more network interfaces from the one or more intermediate nodes located downstream along the path, the response including information that indicates the number of tunnels to be displaced by the selected tunnel if routed over the computed path; and
determine whether to establish the selected tunnel by applying one or more rules to the information that indicates the number of tunnels to be displaced by the selected tunnel, if the selected tunnel were routed over the computed path.

23. The routing node as in claim 22, wherein the selected tunnel is an existing tunnel that is reoptimized from a previous path.

24. The routing node as in claim 23, wherein the software services that determine whether to establish the selected tunnel operate to compute a cost for the path for the selected tunnel, compute a cost decrease of the cost for the path from a previous cost of the previous path, and determine whether to establish the selected tunnel by applying one or more rules to the information about the other tunnels to be displaced by the selected tunnel, if the selected tunnel were routed over the computed path, and to the computed cost decrease.

25. An intermediate node comprising:
one or more network interfaces configured to receive a probe from a routing node requesting information about other tunnels to be displaced if a selected tunnel were routed over a path through the intermediate node,
one or more processors coupled to the network interfaces and configured to execute software services; and
a memory configured to store software services executable by the one or more processors, the software services configured to, when executed,
insert information into the probe about the other tunnels to be displaced at the intermediate node if the selected tunnel were routed over a path through the intermediate node, the information inserted into the probe to indicate the number of tunnels to be displaced, and
forward the probe over at least one of the one or more network interfaces to be returned ultimately to the routing node.

26. The intermediate node as in claim 25, wherein the software services are further configured to, when executed, include one or more characteristics of the other tunnels to be displaced within the information inserted into the probe.

* * * * *